(12) United States Patent
Merewether et al.

(10) Patent No.: US 9,880,309 B2
(45) Date of Patent: Jan. 30, 2018

(54) UTILITY LOCATING TRANSMITTER APPARATUS AND METHODS

(71) Applicants: Ray S. Merewether, La Jolla, CA (US); Mark S. Olsson, La Jolla, CA (US); Jan Soukup, San Diego, CA (US); Ryan B. Levin, San Diego, CA (US); David A. Cox, San Diego, CA (US)

(72) Inventors: Ray S. Merewether, La Jolla, CA (US); Mark S. Olsson, La Jolla, CA (US); Jan Soukup, San Diego, CA (US); Ryan B. Levin, San Diego, CA (US); David A. Cox, San Diego, CA (US)

(73) Assignee: SEESCAN, INC., San Diego, CA (US)

( * ) Notice: Subject to any disclaimer, the term of this patent is extended or adjusted under 35 U.S.C. 154(b) by 0 days.

(21) Appl. No.: 14/229,813

(22) Filed: Mar. 28, 2014

(65) Prior Publication Data
US 2015/0355363 A1    Dec. 10, 2015

Related U.S. Application Data

(63) Continuation of application No. 13/220,594, filed on Aug. 29, 2011, now Pat. No. 8,717,028, which is a continuation of application No. 11/961,858, filed on Dec. 20, 2007, now Pat. No. 8,013,610.

(60) Provisional application No. 60/871,268, filed on Dec. 21, 2006.

(51) Int. Cl.
  *G01V 3/165* (2006.01)
  *G01V 3/10* (2006.01)
  *G01V 3/15* (2006.01)

(52) U.S. Cl.
  CPC ............... *G01V 3/165* (2013.01); *G01V 3/10* (2013.01); *G01V 3/101* (2013.01); *G01V 3/15* (2013.01); *Y10T 24/44376* (2015.01)

(58) Field of Classification Search
  CPC . G01V 3/10; G01V 3/15; G01V 3/165; Y10T 24/44376
  See application file for complete search history.

(56) References Cited

U.S. PATENT DOCUMENTS

| | | | | |
|---|---|---|---|---|
| 3,617,865 A | * | 11/1971 | Hakata | G01V 3/104 324/258 |
| 3,742,341 A | * | 6/1973 | Clowes | G01V 3/101 324/329 |
| 4,348,639 A | * | 9/1982 | Karbowski | G01V 3/108 324/329 |

(Continued)

OTHER PUBLICATIONS

Goldak, Inc., "Triad 2310," Brochure, Glendale, CA.

*Primary Examiner* — Jermele M Hollington
*Assistant Examiner* — Suresh K Rajaputra
(74) *Attorney, Agent, or Firm* — Steven C. Tietsworth, Esq.

(57) ABSTRACT

A high-Q human-portable, battery-powered self-correcting tunable resonator in a transmitter apparatus for inducing alternating currents of high quality in buried conductors to facilitate their location is disclosed. The transmitter apparatus may employ an FET-driven capacitive tuning circuit and a coil design that achieves high precision, high-quality transmission signals, and which may be equipped with a high-voltage booster for facilitating fault-localization applications.

13 Claims, 15 Drawing Sheets

(56) References Cited

U.S. PATENT DOCUMENTS

| | | | | |
|---|---|---|---|---|
| 4,458,204 A * | 7/1984 | Weber | G01V 3/107 | 324/326 |
| 4,631,652 A * | 12/1986 | Wendt | H01F 27/38 | 348/E5.127 |
| 4,691,165 A * | 9/1987 | Szedlmajer | G01V 3/06 | 324/326 |
| 4,785,247 A * | 11/1988 | Meador | G01V 3/28 | 324/338 |
| 4,818,944 A * | 4/1989 | Rippingale | G01V 3/06 | 324/326 |
| 4,953,266 A * | 9/1990 | Trinkaus | A45D 8/00 | 24/303 |
| 5,055,793 A * | 10/1991 | Mulcahey | G01V 3/06 | 324/326 |
| 5,231,355 A * | 7/1993 | Rider | G01V 3/08 | 324/326 |
| 6,822,570 B2 * | 11/2004 | Dimmer | A61B 5/06 | 340/572.1 |
| 7,009,399 B2 * | 3/2006 | Olsson | G01V 3/15 | 324/326 |
| 7,120,564 B2 * | 10/2006 | Pacey | G01V 3/08 | 340/854.8 |
| 7,136,765 B2 * | 11/2006 | Maier | G01V 3/12 | 324/326 |
| 7,221,136 B2 * | 5/2007 | Olsson | G01V 3/081 | 324/326 |
| 7,276,910 B2 * | 10/2007 | Prsha | G01V 3/088 | 324/326 |
| 7,830,149 B1 * | 11/2010 | Olsson | G01S 7/03 | 324/326 |
| 8,013,610 B1 * | 9/2011 | Merewether | G01V 3/101 | 324/228 |
| 8,717,028 B1 * | 5/2014 | Merewether | G01V 3/101 | 24/499 |
| 8,918,070 B2 * | 12/2014 | Shanan | H03F 3/193 | 455/150.1 |
| 2004/0070535 A1 | 4/2004 | Olsson et al. | | |

\* cited by examiner

UTILITY LOCATING TRANSMITTER APPARATUS AND METHODS

CROSS-REFERENCE TO RELATED APPLICATIONS

This application is a continuation of and claims priority to U.S. Utility patent application Ser. No. 13/220,594, filed on Aug. 29, 2011, entitled SPRING CLIPS FOR USE WITH LOCATING TRANSMITTERS, which is a continuation of and claims priority to U.S. Utility patent application Ser. No. 11/961,858, filed on Dec. 20, 2007, entitled HIGH-Q SELF TUNING LOCATING TRANSMITTER, which claims priority under 35 U.S.C. § 119(e) to U.S. Provisional patent application Ser. No. 60/871,268, filed on Dec. 21, 2006, entitled HIGH-Q SELF TUNING LOCATING TRANSMITTER. The content of each of these applications is hereby incorporated by reference herein in its entirety for all purposes.

FIELD OF THE INVENTION

The present invention relates generally to systems for locating and tracing buried objects. More particularly, but not exclusively, the invention relates to apparatus and systems for inducing an alternating electrical current in a buried conductor to facilitate the detection and tracing thereof with an electronic signal detection system.

BACKGROUND

There are many situations where is it desirable to locate buried utilities such as pipes and cables. For example, before starting any new construction that involves excavation, worker safety and project economic concerns require the location and identification of existing underground utilities such as underground power lines, gas lines, phone lines, fiber optic cable conduits, cable television (CATV) cables, sprinkler control wiring, water pipes, sewer pipes, etc., collectively and individually herein referred to as "buried objects."

As used herein, the term "buried objects" includes objects located inside walls, between floors in multi-story buildings or cast into concrete slabs, for example, as well as objects disposed below the surface of the ground. If excavation equipment such as a backhoe hits a high voltage line or a gas line, serious injury and property damage may result. Unintended severing of water mains and sewer lines generally leads to messy and expensive cleanup efforts. The unintended destruction of power and data cables may seriously disrupt the comfort and convenience of residents and bring huge financial costs to business. Accordingly, the art is replete with proposed solutions to the buried object locating problem.

A sonde typically includes a coil of wire wrapped around a ferromagnetic core that is packaged for insertion into a buried nonconductive conduit, such as a plastic utility runway or a concrete water pipe. Still other buried objects, such as conductive lines and pipes, may be located by first applying an external electromagnetic signal to the object to induce an alternating current therein, thereby energizing the object with a nonzero frequency magnetic field that may be detected by a magnetic sensor. For example, an external electrical signal source (transmitter) having a frequency in the range of approximately 4 Hz to 500 kHz has a well-known utility for energizing conductive objects by direct electrical coupling to permit their location. These examples of active and passive location of buried long conductors are also commonly described as "line tracing."

Employing a directly-coupled external transmitter to induce an alternating current in a buried conductive object is useful, if the buried line is accessible for the conductive attachment of the transmitter output signal. When there is no conductive access to the buried conductor, such a transmitter may alternatively be used to indirectly induce an alternating current in the buried line, but this approach as used in the art has several well-known limitations.

Thus, improving the transmitter signal for direct or inductive coupling to a buried conductor by overcoming well-known deficiencies in the art would enhance the ability to locate the buried conductor. Improving transmitter reliability and reducing frequency drift, which is a well-known problem that eventually moves the transmitted pulse peak away from the pre-selected induction frequency, would likewise be beneficial, as would enhancing the transmitter output circuit quality (Q)-factor to improve the ratio of energy stored to energy lost per cycle, for example.

Accordingly, there is a need in the art for improved self-tuning inductive transmitters to solve the above problems as well as others.

SUMMARY

This disclosure is directed generally to transmitters for use in detecting buried or hidden objects. In one aspect, the disclosure relates to human-portable transmitter apparatus incorporating an adaptive, self-correcting tunable high-Q resonator for inducing precisely-controlled alternating electrical currents in one or more buried conductors. The apparatus may include an inductive coil having a novel conductor arrangement to reduce AC-loss. The majority of the transmitter circuitry other than the coil may be disposed outside the coil to optimize the quality ("Q") factor of the output circuit. The majority of the transmitter circuitry, including the coil, may be enclosed within a substantially non-conductive, non-magnetic case to optimize transmitter output. The circuit may include one or more switchable capacitors available for tuning the tank circuit. The transmitter apparatus may be equipped with a High-Voltage Booster adaptor assembly to facilitate injection of a high-voltage signal for high-impedance locating and fault-finding applications. One potential advantage of a such a transmitter apparatus is that the apparatus output circuit may be adaptively retuned to a predetermined resonant frequency value $f_{R1}$ responsive to any circuit resonance changes arising from phenomena such as component heating, thereby facilitating the very high output circuit current needed from the battery-powered source to produce the very high magnetic flux output desired.

In another aspect, the disclosure relates to a human-portable transmitter apparatus for generating an output signal having a frequency suitable for inducing an alternating electrical current in a buried conductor, including: a User Interface (UI) for accepting operator commands; a controller coupled to the UI for selecting a desired output signal frequency value $f_{R1}$ responsive to an operator command; an exciter circuit coupled to the controller for generating an excitation signal having a frequency corresponding to the desired output signal frequency value $f_{R1}$; an electrical resonator coupled to the exciter circuit with a primary resonant frequency value $f_R$ and having a conductor assembly with an aggregate inductance value L and a plurality of capacitors with an aggregate capacitance value C disposed in connection with the conductor assembly to provide the primary resonant frequency value $f_R$; and adaptive tuner coupled to the controller and the electrical resonator that adjusts the number of capacitors coupled to the conductor assembly responsive to the difference between the desired output signal frequency value $f_{R1}$ and the primary resonant frequency value $f_R$, thereby obtaining the capacitance value C necessary to produce the output signal having the desired frequency value.

In another aspect, the disclosure relates to a human-portable transmitter apparatus for generating an output signal having a frequency suitable for inducing an alternating electrical current in a buried conductor, including: a User Interface (UI) for accepting operator commands; a controller coupled to the UI for selecting a desired output signal frequency value $f_{R1}$ responsive to an operator command; an exciter circuit coupled to the controller for generating an excitation signal having a frequency corresponding to the desired output signal frequency value $f_{R1}$; an electrical resonator coupled to the exciter circuit with a primary resonant frequency value $f_R$ and having a capacitor assembly with a capacitance value C and a plurality of conductors with a aggregate inductance value L disposed in connection with the capacitor assembly to provide the primary resonant frequency value $f_R$; and an adaptive tuner coupled to the controller and the electrical resonator that adjusts the number of conductors coupled to the capacitor assembly responsive to the difference between the desired output signal frequency value $f_{R1}$ and the primary resonant frequency value $f_R$, thereby obtaining the capacitance value C necessary to produce the output signal having the desired frequency value.

Various additional aspects, details, and functions are further described below in conjunction with the appended drawing figures.

BRIEF DESCRIPTION OF THE DRAWINGS

For a more complete understanding of this invention, reference is now made to the following detailed description of the embodiments as illustrated in the accompanying drawings, in which like reference designations represent like features throughout the several views and wherein.

DETAILED DESCRIPTION

Figure 1:
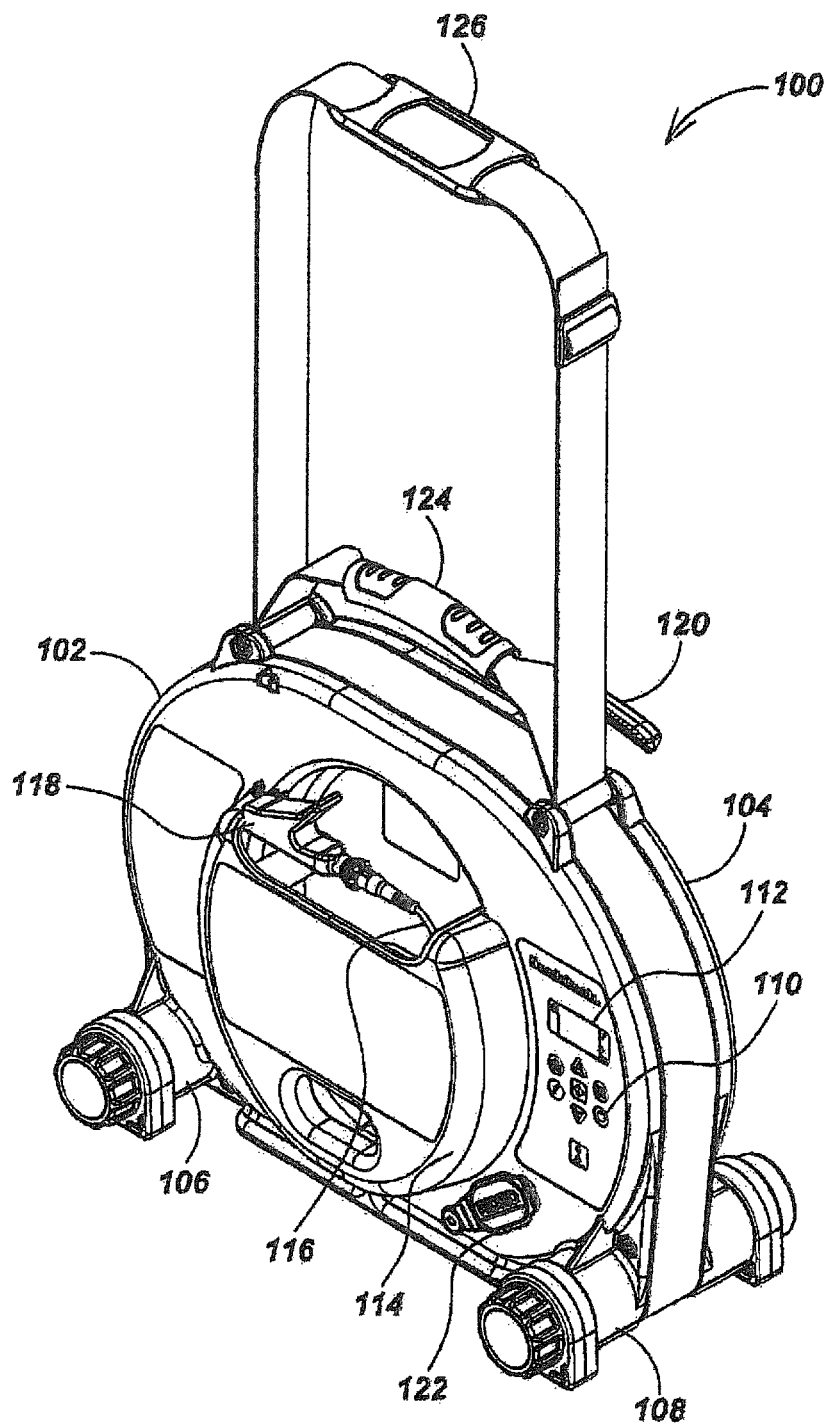
FIG. 1 illustrates an oblique front view of an exemplary embodiment of a transmitter apparatus of this invention showing its storage pocket, battery pods, transmitter control panel, and LED display elements.

This application is related by common inventorship and subject matter to the commonly-assigned U.S. Pat. No. 7,276,910, entitled "Compact Self-Tuned Electrical Resonator for Buried Object Locator Applications," issued Oct. 2, 2007, and the commonly-assigned U.S. Pat. No. 7,009, 399, entitled "Omnidirectional Sonde and Line Locator," issued Mar. 7, 2006, both of which are entirely incorporated herein by reference. This application is also related by common inventorship and subject matter to the commonly-assigned U.S. patent application Ser. No. 10/956,328 filed on Oct. 1, 2004, entitled "Multi-Sensor Mapping Omni-directional Sonde and Line Locators and Transmitter Used Therewith," now U.S. Pat. No. 7,336,078, to commonly-assigned U.S. patent application Ser. No. 11/054,776 filed on Feb. 9, 2005, entitled "Locator with RF Correlation;" commonly-assigned U.S. patent application Ser. No. 11/106,894 filed on Apr. 15, 2005, entitled "Locator with Apparent Depth Indication," now U.S. Pat. No. 7,332,901, and to commonly-assigned U.S. patent application Ser. No. 11/774, 462 filed on Jul. 6, 2007 by Mark S. Olsson, entitled "Mesh Networked Wireless Buried Pipe and Cable Locating System," all of which are entirely incorporated herein by reference.

The human-portable transmitter apparatus of this invention is embodied for inducing alternating electrical currents in any proximate conductor of interest and includes a tunable output circuit (also herein denominated "tank circuit") that is adaptively retuned to a predetermined resonant frequency value $f_{R1}$ by automatic adjustment of one or more circuit elements. One embodiment of the tank circuit includes multiple capacitors of various sizes each controlled by a suitable switching mechanism such as, for example, one or more power field-effect transistors (FETs) controlled to maintain the desired tuned circuit resonant frequency value $f_{R1}$. The transmitter apparatus of this invention operates to reduce output signal power loss by facilitating a higher output circuit Q-factor at a given frequency. As is well-known in the art, the Q-factor of an LC resonator is defined to be $2\pi$ times the ratio of energy stored to energy lost per cycle, which may easily be shown to be equal to the circuit resistance multiplied by the square root of the ratio of circuit capacitance to circuit inductance, which is also equal to the ratio of resonant frequency to half-power bandwidth for the LC resonator. A higher Q arises from lower rate of energy dissipation per oscillation. Other things being equal, a high-Q transmitter is more advantageous for line-tracing applications than one of a lower Q-factor.

One transmitter apparatus embodiment of this invention includes a cylindrical spiral multi-strand Litz wire air-cored coil winding, in which the Q of the coil output is improved by configuring the coil cylindrically, or nearly so, and by placing the majority of transmitter elements such as batteries, circuit components, control devices and display devices outside the cylinder defined by the resonant coil windings. A particularly useful and suitable type of Litz wire comprises many thin wires, individually coated with an insulating film, and in some cases braided, thereby increasing the effective surface area of the conductor and reducing the skin effect and associated power losses when used with high-frequency applications. The ratio of energy stored to energy lost per cycle is increased, relative to a solid conductor, resulting in a higher Q factor at these frequencies. Litz wire generally includes multiple insulated conductors having a small cross-section and braided, or woven, or twisted in groups of twisted elements, or in combination, or otherwise arranged so that each conductor is only briefly proximate a particular neighboring conductor over a very short length. Increasing the number of Litz wire conductors for a given cross-sectional area significantly reduces eddy current losses and practically eliminates skin effect problems.

The transmitter apparatus may incorporate a tank circuit that is adaptively and dynamically tuned to a predetermined or selected resonant frequency value $f_{R1}$ responsive to any changes in resonance arising from phenomena such as component imprecision or heating, thereby supporting very high tank circuit currents from battery-powered source to produce precisely controlled, very high magnetic flux output.

The transmitter apparatus may include at least one field-effect transistor (FET) or integrated gate bipolar transistor or similar device for switching tuning capacitors in and out of the transmitter tank circuit.

The transmitter apparatus may include logic controls for facilitating adaptive self-tuning of the output tank circuit. Such an embodiment may also include logic for cycling through various tuning combinations while seeking a maximum output signal regardless of frequency, for example. Such capability may be operated in cooperation with a frequency-scanning broadband locator or frequency-scanning receiver having the means for identifying the maximum output signal and its frequency to facilitate line tracing on that frequency, for example.

Preferably, non-magnetic and non-conductive materials are used for the transmitter enclosure, the support structures, the coil winding support form, and fasteners used in assembly to minimize loss and maximize Q-factor of the transmitter's output signal. The transmitter apparatus may be embedded in a case that substantially disposes the transmitter batteries, the capacitors and tank circuit, the transmitter control board and display unit, and other electronic components outside the cylinder defined by the resonant coil windings of the transmitter. In one embodiment, the plastic housing of the transmitter is sealed for improved water-resistance by means of, for example, dual-layer adhesive tape.

The batteries for powering the human-portable transmitter apparatus are preferably contained in the pods forming the feet of the transmitter case. These batteries may be disposed separately in at least two groups, one of which is further from the transmission coil than the other. In another embodiment, the transmitter apparatus includes removable, externally rechargeable battery units and may include an external power adaptor.

In the preferred embodiment, the transmitter apparatus is embedded in a case that aligns the battery axes with the resonant coil axis of rotation.

An electrically insulating medium may be used to seal the enclosure halves together. The transmitter case may provide a pocket formed on each transmitter enclosure face (front and back) for the storage of a front connecting cable and a back connecting cable. As used herein, the front face of the case is the face containing the operator interface LCD and control panel. The inner wall of each such pocket may extend from each of the front and back planar surfaces into the cylinder defined by the coil windings inside the enclosure of the transmitter.

Preferably, the transmitter apparatus includes means making it capable of self-standing at an angle relative to the plane of the ground such as, for example, an integral folding stand.

Preferably, the transmitter apparatus includes a vertically-oriented ground-stake storage feature and a single strap having two segments, one adapted to serve as a carrying handle and the other adapted to serve as a shoulder-strap for carrying the transmitter.

The transmitter apparatus may include a user interface (UI) capability allowing the operator to define and set an operator-determined frequency. In one embodiment, the user interface produces a pop-up screen activated by depressing a predefined key, with which the user may choose or set a desired frequency, which may then be either activated in the transmitter or stored for later use.

The transmitter apparatus may include color-coded connection clips useful for indicating current direction with respect to the transmitter. The transmitter connecting cables may be embodied as extensible coil cords, each including a conductor having a ratio of copper to steel between 10% and 90%. Each color-coded spring clip may include a magnetic connector adapted to electrically connect the cord by magnetic coupling to an integral metal surface such that either magnetic or spring-driven connection may be used without removing the clip. The insulating cover around each lead clip is color coded to define current direction for the operator's convenience. In an alternative embodiment, a standard spring-clip connector may be replaced with a magnetic connector for attaching a transmitter lead to a metal surface. The clip may also incorporate a scraper tip with serrated edges to facilitate operator removal of dirt, paint or other impediment to a conductive connection.

In one embodiment, the transmitter apparatus includes a Global Positions System (GPS) sensor chip to provide position information and a time-stamp. The transmitter apparatus may also include other real-time timing devices and may include means such as, for example, Bluetooth, infrared data transfer, etc., means for connecting with control devices, data storage units, power supplies, locators or other like devices deployed in a locating context. The transmitter apparatus may also include a compass unit for providing orientation data, such as the azimuth of the transmitter, for example, for transfer to a remote device or devices. The transmitter apparatus may also include a tilt sensor for providing vertical orientation data, such as the elevation angle of the transmitter, for example, to a remote device or devices.

In another embodiment, the transmitter apparatus includes a coupled High Voltage (HV) Booster Adaptor unit to provide additional high voltage signals useful for facilitating certain locating operations. The HV Booster Adapter provides a voltage booster for use, for example, in sheath-fault finding. High voltage is often useful for forcing conduction across a line fault, which usually provides a non-linear response useful for detecting and localizing the fault. In fault-finding mode, the HV Booster Adaptor operates to add to the transmitter AC output a DC voltage of 1000V or more. In a second high-voltage mode, the HV Booster Adapter operates to modify the normal transmitter output, used in line tracing, to a high voltage output at some predetermined frequency, such as 33 kHz or 93 kHz, which is useful for driving a locating signal across some high-impedance barriers in a conductor of interest (such as a high-impedance coupling in a pipeline, for example).

The HV Booster Adaptor unit may include an infrared (IR) data transceiver to facilitate command and data exchange with the central processing unit (CPU) in the transmitter apparatus. Such an IR link includes matching transceivers at each end to facilitate bidirectional communication between the transmitter on-board CPU and another device plugged into the output-signal connectors inside the cord pocket on the exterior of the transmitter case, for example. Preferably, the transmitter case material is sufficiently transparent to IR energy to pass message signal transmissions. To minimize the effects of ambient light, the IR carrier is preferably modulated at 40 kHz and On/Off Keyed (OOK) with the message data. The external IR transceiver communicates with a matching transceiver inside the transmitter case; each including an Infra-Red Emitting Diode (IRED) and a demodulating detector. The range of communication could easily be extended by simply increasing the IRED drive power.

The transmitter apparatus output signal is preferably controlled by means of a microprocessor, which permits the operator to demand an output waveform tailored to any particular situation by, for example, defining a center frequency or generating a custom waveform. In one embodiment, a Bluetooth (or similar protocol, for example) telemetry link is built in to the transmitter to permit the operator to modulate the output pulse train by remote command, such as from a remote locator system while conducting a fault-finding search, for example.

FIG. 1 illustrates an oblique front view of an exemplary embodiment 100 of a transmitter apparatus of this invention, which includes a case formed from a front shell 102 and a back shell 104. The case rests on two feet 106 and 108, which also serve as the left and right battery pods 106 and 108, each containing a battery tube (not shown) for holding batteries (not shown). The front planar face of front shell 102 includes an attached front storage pocket 114 used for storing the front coil cord 116, which terminates in a clip connector 118. An exemplary user interface (UI) embodiment for the transmitter apparatus includes the liquid-crystal display (LCD) 112 and the membrane-covered control panel 110 on the front shell 102 for accepting user commands, for example. A flexible rubber dust cover 122 is seated over a recessed area in which are disposed jacks (not shown) for the attachment of an external power supply (not shown) and an inductive clamp (not shown). A removable grounding stake 120 is secured to a built-in holder. A single continuous strap is threaded through a series of restraints and thereby divided by closures into two segments to form a carrying handle 124 and a shoulder strap 126 for use during transport of the transmitter apparatus.

Figure 2:
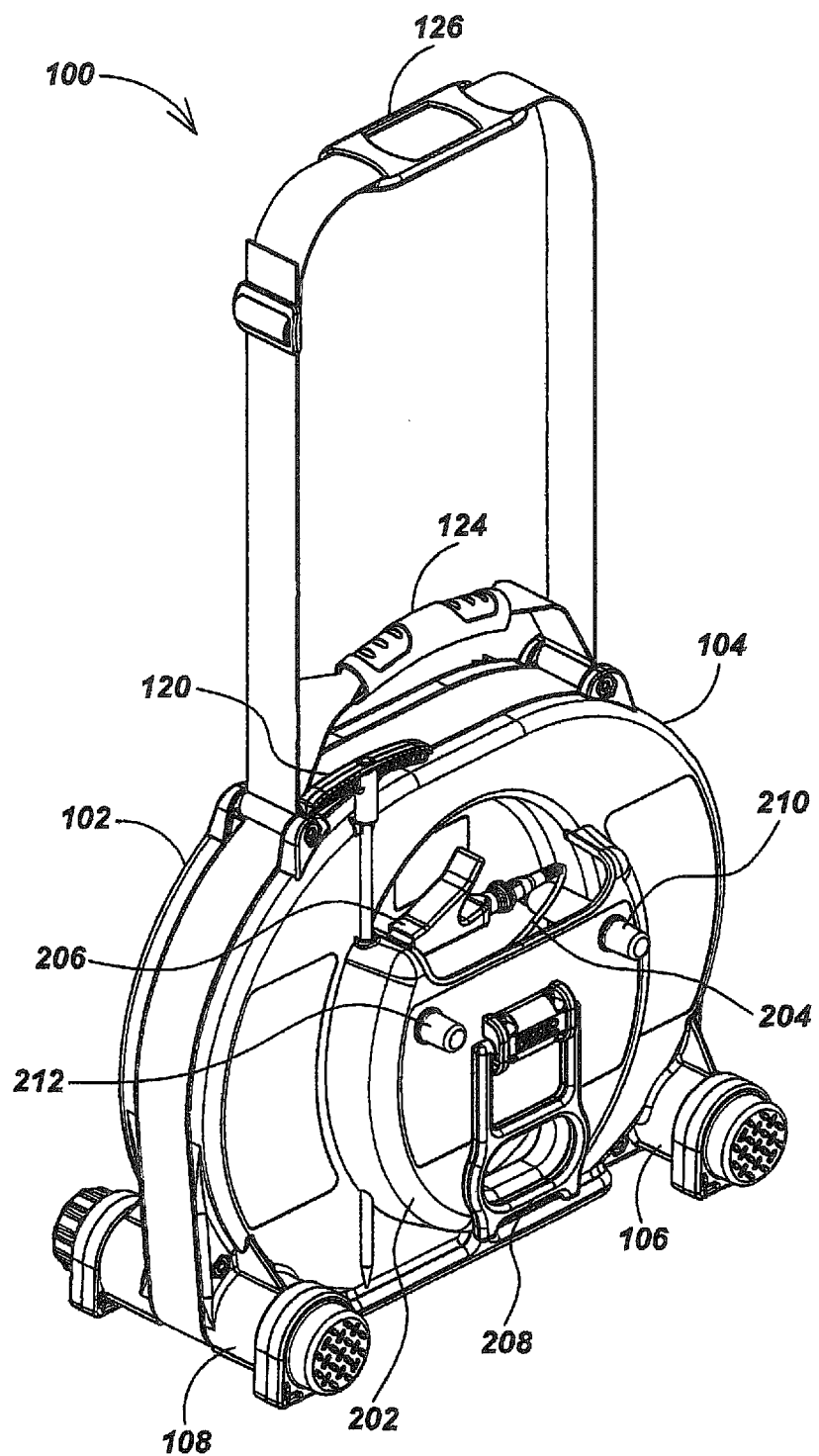
FIG. 2 illustrates an oblique back view of the transmitter apparatus embodiment of FIG. 1 showing the case kickstand, stored grounding stake, back storage pocket and stored coil cord elements.

FIG. 2 illustrates an oblique rear view of transmitter apparatus 100 revealing back shell 104. The storage holder for the ground stake 120 may be seen on the left side of the rear attached storage pocket 202. The two posts 210 and 212 are attached to the form covering storage pocket 202, and a foldable kick-stand 208 is attached to the outer surface between and below the posts 210 and 212. The kickstand 208 when folded out facilitates disposing the apparatus 100 at an angle of approximately 45 degrees to the plane of the ground, which disposition is convenient when directly connecting to a conductor and when inductively coupling to one conductor underground and avoiding a parallel conductor. The posts 210-212 allow transmitter apparatus 100 to be laid on its back. The rear storage pocket 202 contains a second coil cord 204 terminating in a connection clip 206. Alternatively, an optional magnetic connection clip may be used (see FIG. 8). In use, the ground stake 120 is removed from its holder and inserted into the ground and either one of the coil cords 116 or 204 is connected to the ground stake using the associated terminal clip 118 or 206 to provide a reliable ground for the tracing circuit. The remaining coil cord 204 or 116 is similarly connected to an accessible part of the conductor of interest; e.g., a pipe or cable. Instead of the coil cords 116 and 204, an inductive clamp (not shown) may be plugged into the associated jack (not shown) beneath the rubber dust cover 122 (FIG. 1) and clamped around a conductor of interest to induce a tracing signal into it. Alternatively, a more remote inductive mode may be used, which does not require direct access with cables or an inductive clamp. As seen in both FIGS. 1 and 2, the front and back pocket spaces extend into the cylinder defined by the coil winding.

Figure 3:
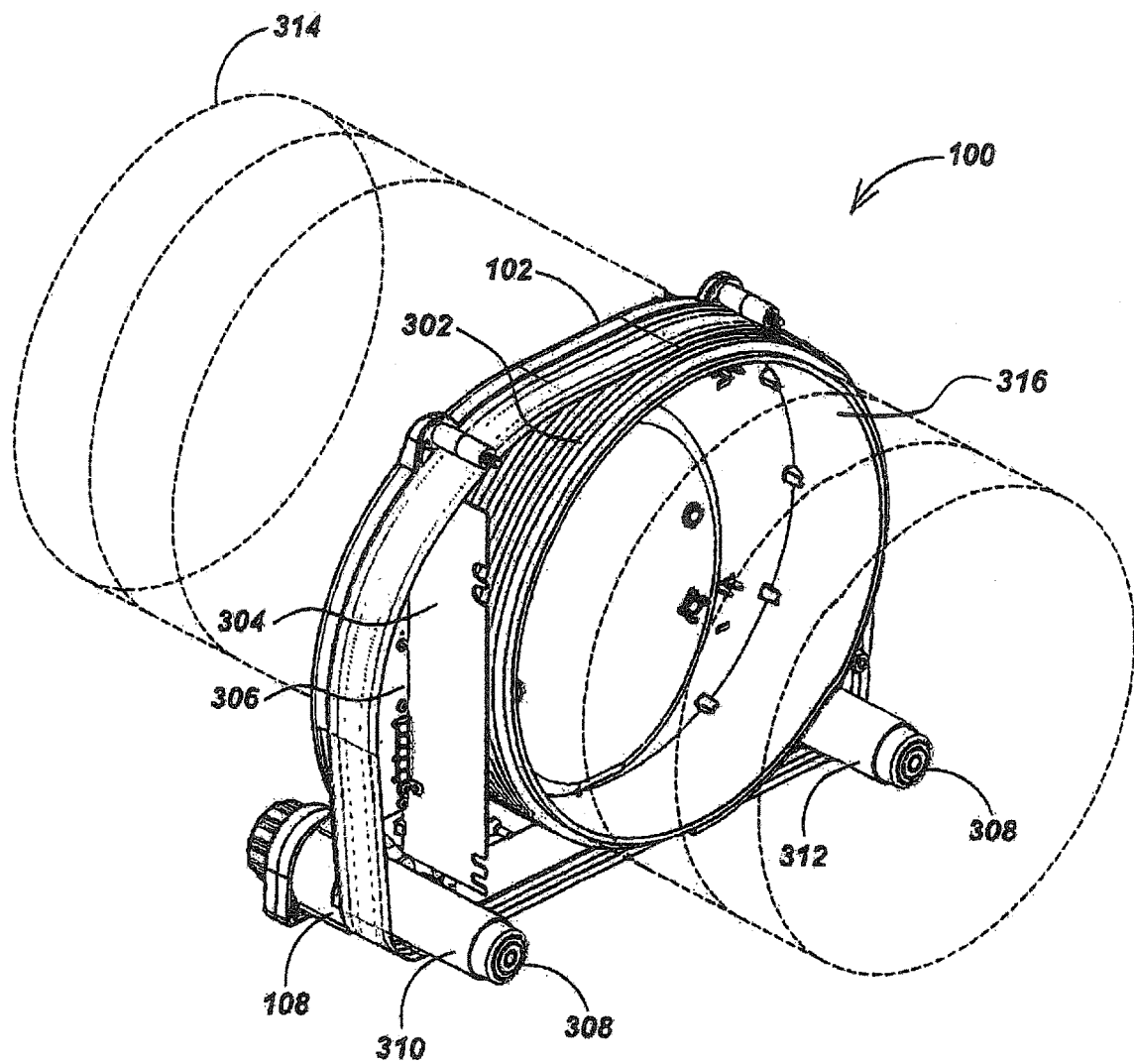
FIG. 3 illustrates a cutaway view illustrating the physical configuration of the circular or cylindrical spiral Litz-wire air-core coil winding element and the circuit component and battery element locations for the transmitter apparatus embodiment of FIG. 1.

FIG. 3 is a cutaway view illustrating the physical configuration of transmitter apparatus 100, which is organized so that at least the majority of the electronic components are disposed outside of a cylinder 314 defined by the resonant coil winding 302. In FIG. 3, the preferred substantially-circular Litz-wire air-core coil winding 302 is disposed apart from the associated driver circuit board 304 and the control-panel circuit board 306. Other winding forms may also be uses, such as, for example, a cylindrical, spiral or conical spiral form. The battery pods (exemplified by the battery pod 108 shown in cut-away view) contain the internal battery tubes 310 and 312 and the batteries 308. As may be seen from FIG. 3, the air-core coil windings 302 define a cylinder 314 that is unimpeded by a majority (e.g., at least fifty percent) of all other electronic components (e.g., circuit boards, discrete components and/or batteries) that are located outside the cylinder 314. Cylinder 314 may be appreciated as a core volume disposed about an axis of rotation (not shown) defined by the coil winding form employed to assembly coil winding 302, for example. The front shell 102 and the back shell 104 (FIGS. 1 and 2) provide a winding support form for the winding 302. Alternatively, a separate support form of non-conducting material (not shown) may be used. The case of the transmitter apparatus 100, which includes front shell 102 and back shell 104 (FIG. 2), preferably consists of a substantially non-conductive, non-magnetic material such as molded plastic and is disposed to enclose the winding 302, driver circuit board 304 and control circuit board 306. This feature of transmitter apparatus 100 improves efficiency by reducing circuit dissipation and increasing the Q-value of the transmitter output circuit's, where the "Q-value" is directly related to the ratio of energy stored to energy lost per unit time.

Figure 4:
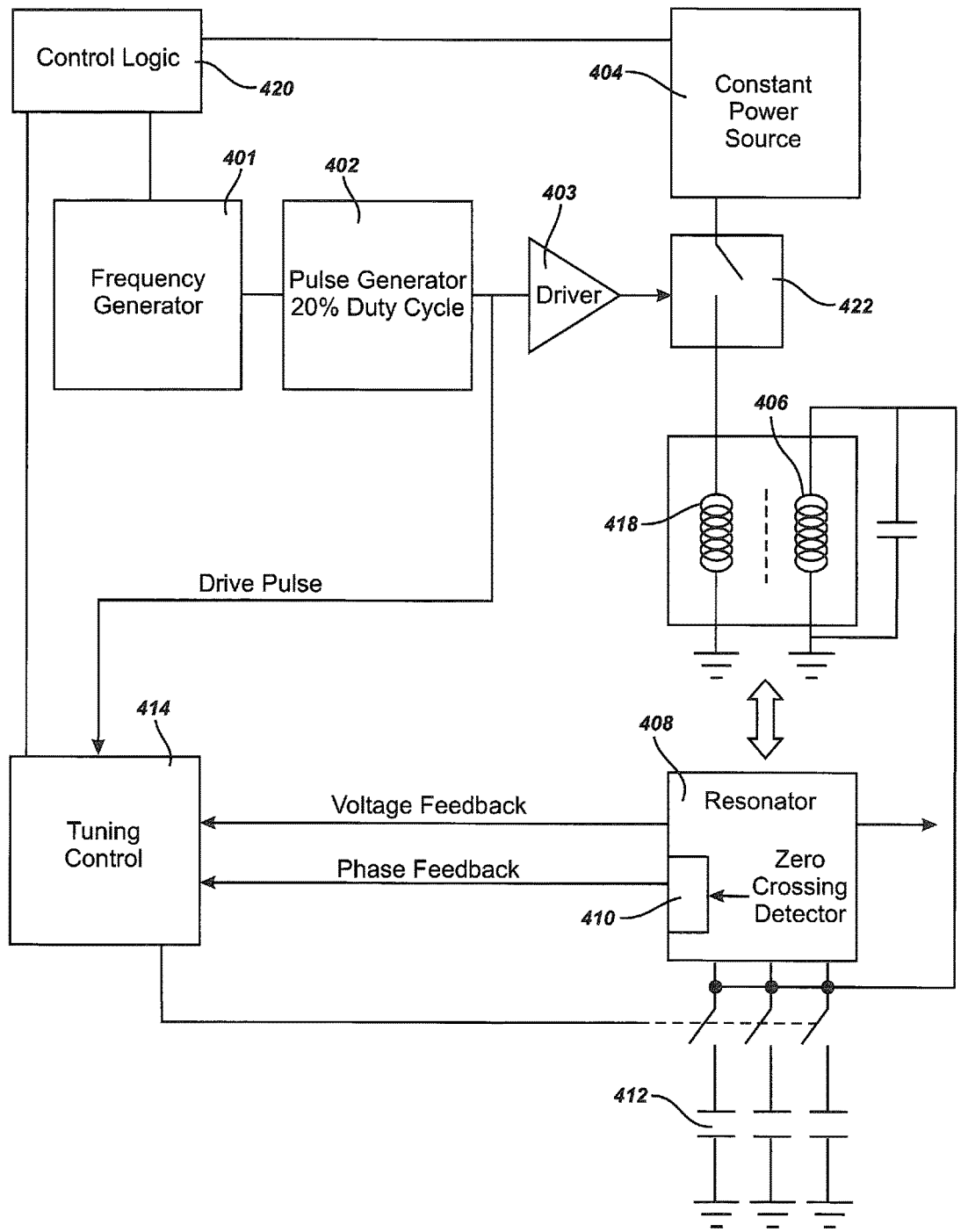
FIG. 4 is a schematic diagram illustrating an embodiment of the flow of control logic governing the coil output through the power FETs with their associated tuning capacitors, and an exemplary circuit embodiment embracing the tank circuit and logic elements and the high-Q coil winding circuit.
Figure 5:
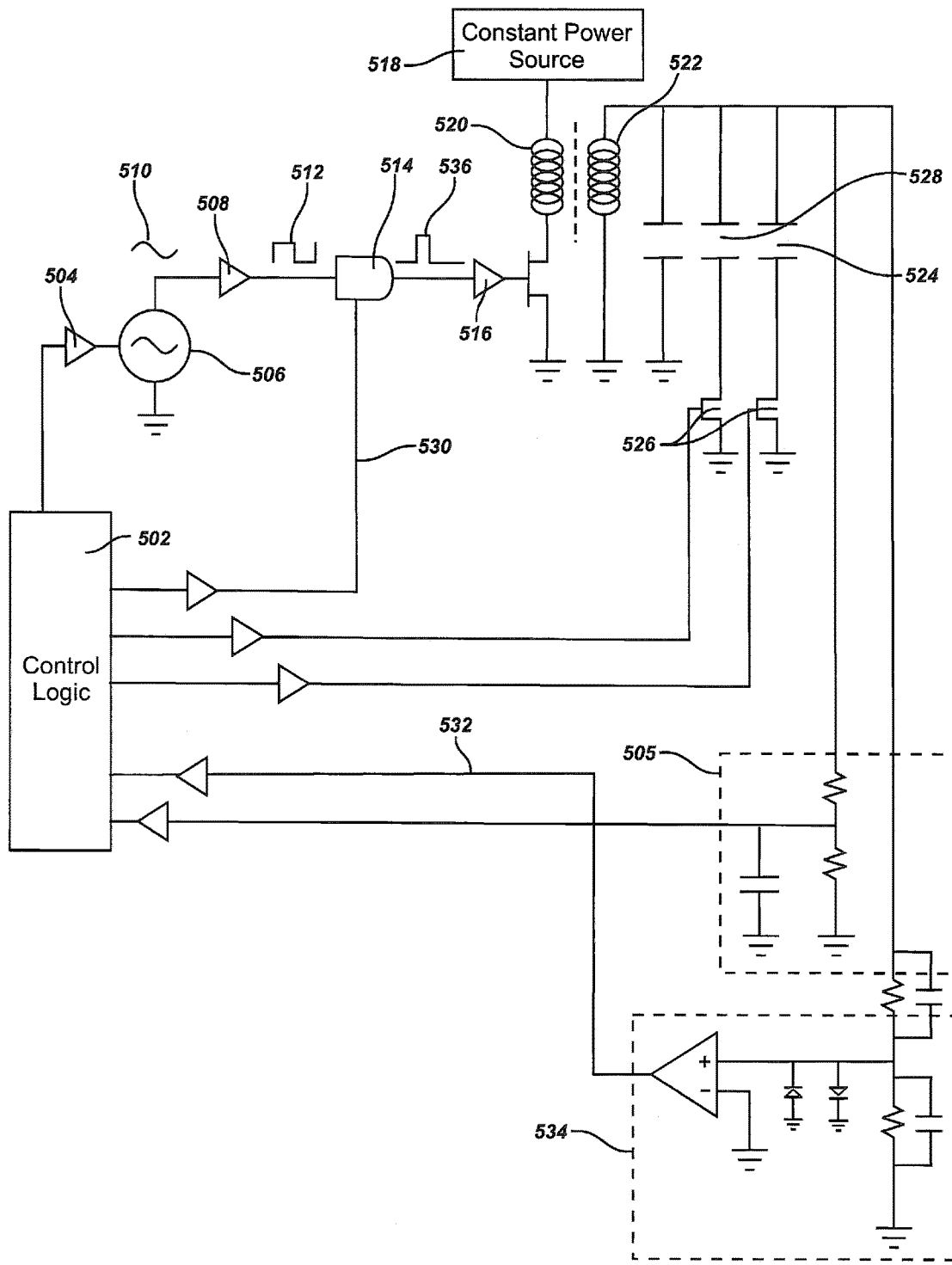
FIG. 5 is a schematic diagram illustrating an embodiment of the high-level component circuitry for the transmitter apparatus embodiment of FIG. 1.

FIG. 4 is a schematic diagram illustrating a circuit embodiment suitable for the transmitter apparatus 100. Governed by the control logic 420, a drive pulse is transmitted by a frequency generator 401 and modified by a pulse generator 402 to form a 20% duty-cycle waveform (not shown). The drive pulse is coupled to the tuning control logic 414 and also to a FET driver 403 that governs the state of the switch 422 connected to a constant power source 404. Switch 422 may be a bipolar junction transistor (BJT), integrated gate BJT, MOSFET, or other switching device. The resulting timed power-pulse is coupled to the exciter coil 418, which in turn excites a resonator winding 406. In the resonator circuit 408, phase and peak voltage detection (not shown) and voltage zero-crossing detection 410 are used to generate feedback signals to the tuning control logic 414. Control logic 414 effects changes to the output circuit capacitance by switching selected tuning resonator capacitors 412 in and out of the circuit to maintain a precise desired resonant frequency value fR1 in the tuned circuit, which is well-known to be proportional to the reciprocal of the square root of the product of aggregate tank circuit inductance and capacitance so that increasing either circuit value reduces resonant frequency value fR FIG. 5 shows a high-level component circuitry embodiment suitable for the transmitter apparatus 100. Frequency-control data are coupled to the buffer 504 and then to a frequency source 506, which provides a predetermined frequency output signal 510 to the buffer 508, which produces a square wave 512 of the same frequency in the usual manner. This square wave 512 is modulated by a gate driver 514 to produce a 20% duty cycle pulse train 536, which is coupled to the FET driver 516 to modulate the constant power signal flowing from the power source 518 through the exciter winding 520. Control logic from the logic board 502 produces the pulse width control signal 530, which regulates the gate driver 514. The resonator 522 frequency response is a function of the winding circuit characteristics, which may be modified by adding and subtracting selected fixed capacitors 524 or 528. The resonator circuit capacitance may be tuned by any desired degree with the switching in or out by the tuning FETs 526 of one or more resonator capacitors 524 or 528 under the control of signals from the logic board 502. A phase detection circuit 534 and voltage detection circuit 505 may provide phase and voltage feedback 532 to the logic board 502 for use in refining the actual resonator frequency.

In FIG. 5 as shown, when a selected capacitor 524 or 528 is switched by a single FET 526, the FET body diode charges capacitors 524 to the peak tank voltage minus a FET diode junction drop. On the next half cycle, the FET must withstand the peak-to-peak voltage because the coil voltage and the charge on the tuning capacitor add together. If the FET 526 is replaced with two FETs (not shown) configured in a back-to-back arrangement to isolate each FET body diode with the other back-biased junction, the tank circuit may be operated at higher voltages and/or a lower FET voltage rating may be used.

Transmitter apparatus 100 can maintain unusually high Q-factors in the output tank because: (a) most or all components are disposed outside of the cylinder defined by the air-core Litz wire windings, (b) the current path is short, and (c) the high quality and low loss of the typically high-current polypropylene dielectric capacitors used. Transmitter output application is also enhanced because of the adaptive self-tuning capability provided by the feedback-controlled FET-switched capacitors, which are preferably dynamically switched in and out the resonator circuit as required by control logic interpretation of resonator circuit feedback. These features together serve to minimize power dissipation during circuit operation and to maximize the output frequency stability and accuracy.

Figure 6A:
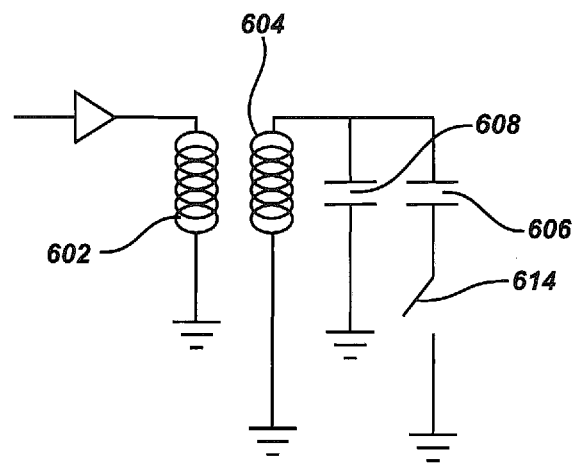
FIG. 6A is a detail circuit diagram illustrating a frequency tuning embodiment facilitated by adjusting capacitance using FET-controlled capacitors.

FIG. 6A illustrates an exemplary tank circuit embodiment having an exciter coil 602, a resonator coil 604, a fixed capacitor 608, and one exemplary instance of a switch-, relay-, or FET-controlled capacitor 606. When relay 614 is closed, capacitor 606 is added to the LC tank circuit, which includes the resonant coil. The change in capacitance results in a corresponding change in the resonant frequency value $f_R$ of the LC circuit, depending on the value of the added capacitance. Adding capacitance lowers the existing resonant frequency value $f_R$. An array of individually switched capacitors of various sizes (e.g., 1×, 2×, 4×, 8×, 16×, etc.) facilitates improved tuning precision.

Figure 6B:
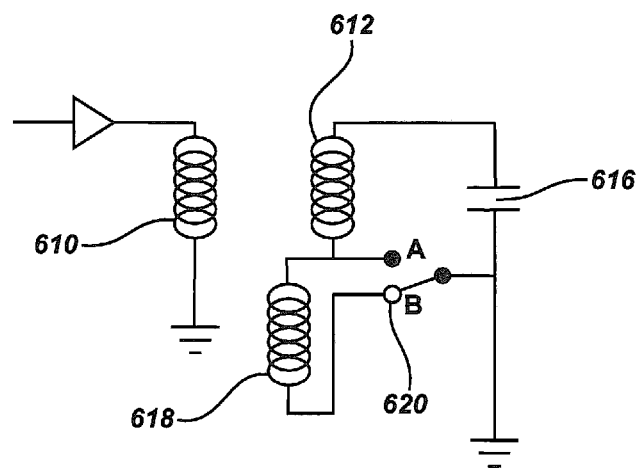
FIG. 6B is a detail circuit diagram illustrating an alternative frequency tuning embodiment facilitated by adjusting inductance in the tank circuit.

Of course, it may be readily appreciated by those skilled in the art that a similarly precise resonance control may be embodied as a controlled by modulation of the tank circuit inductance. In FIG. 6B, the exciter coil 610 is inductively coupled to the resonator coil 612, which is conductively coupled to a fixed capacitor 616 and a single exemplary instance of a separate inductive coil 618 switched into the circuit by the relay 620. Relay 620 may be controlled by FET circuits associated with logic control as in earlier examples, for example. When the lower side (B) of switch 620 is closed, inductor 618 is added to the LC circuit with the resonator coil 612, which lowers the resonant frequency by an amount related to the inductance of inductor 618. As may be appreciated by those skilled in the art, a series of inductors of various values (e.g., 1×, 2×, 4×, 8×, 16×, etc.) facilitates improved tuning precision.

Figure 7:
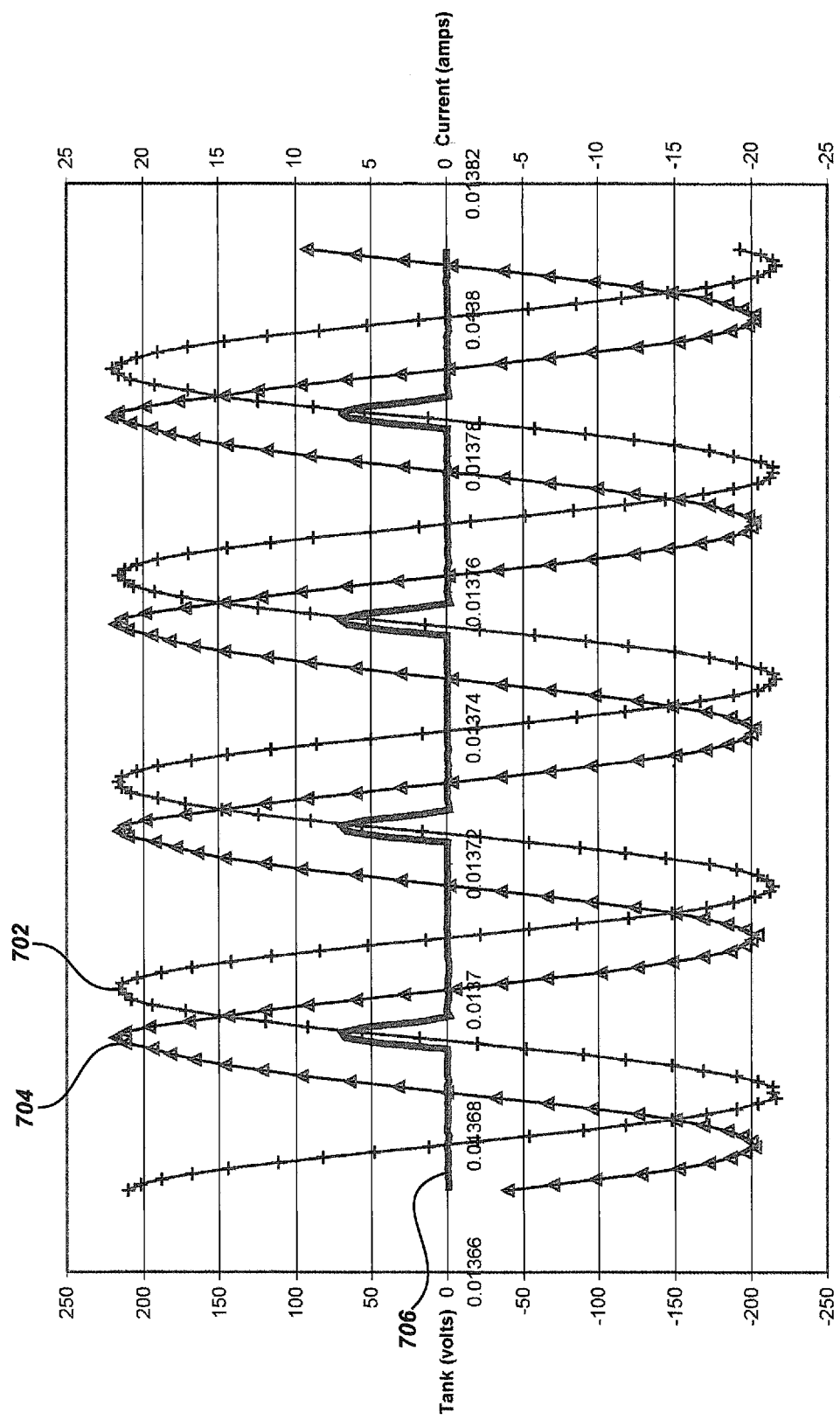
FIG. 7 is a waveform diagram illustrating the relationship of sample voltage, average current, and pulse current during operation at 32.768 kHz of a transmitter apparatus embodiment of this invention.

FIG. 7 is a waveform diagram illustrating the relationship among tank circuit voltage 702, average tank circuit current 704, and exciter pulse current 706 during operation of the resonant output circuit at 32.768 kHz of an exemplary transmitter apparatus embodiment. In this example, the transmitter output LC circuit Q values range between 290 and 300, which exemplify the higher Q values featured by the transmitter apparatus of this invention. For appreciation of the prior LC circuit art, reference is made to, for example, Lourens [R. Lourens, "Low Frequency Magnetic Transmitter Design," 2002, Publication AN232, Microchip Technology, Inc.], who states that "for 2% [tolerance] parts, a Q of 20 works very well." The higher Q values in the output circuit of, for example, the transmitter apparatus 100, are achieved through the introduction of Litz-wire winding optimization, component disposition outside of the cylinder defined by the coil windings, and introduction of the above-described efficient adaptive self-tuning control circuits employing low-loss polypropylene-dielectric capacitors.

Figure 8A:
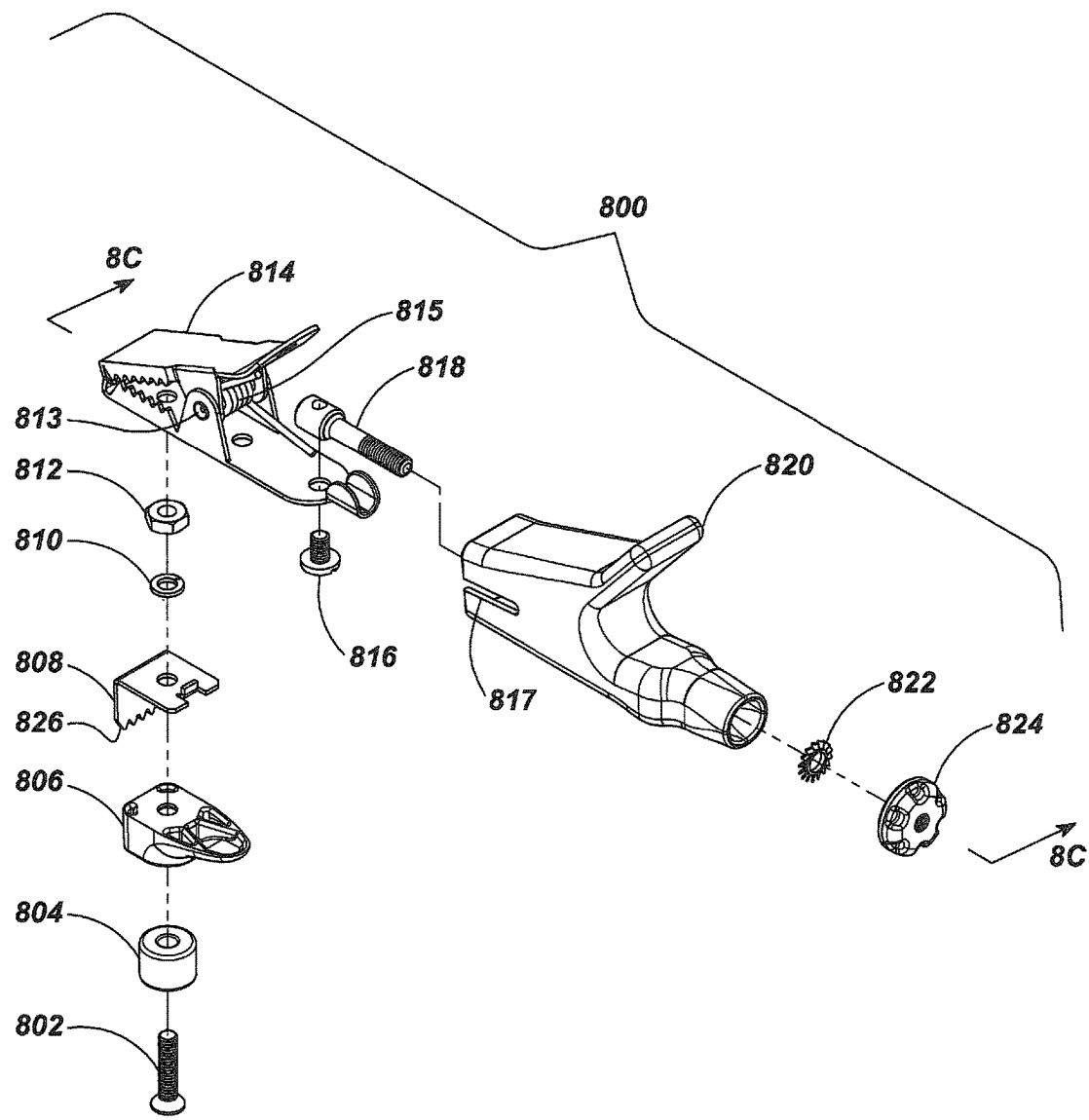
FIG. 8A is an expanded view of a color-coded connection spring-clip assembly suitable for use with the transmitter apparatus embodiment of FIG. 1, showing an alternative magnetic attachment device integrated into the clip structure.

FIG. 8A is an expanded view of a color-coded connection spring-clip assembly 800 suitable for use with transmitter apparatus 100, showing a thumb-actuated spring clip 814 and an alternative magnetic attachment device integrated into the clip structure including a magnet 804, the housing 806, and a scraper edge 808 suitable for use in removing barriers such as paint or dirt to allow a satisfactory electrical connection. Spring clip assembly 800 includes a thumb-actuated spring clip 814. The spring clip 814 has a pair of opposing jaws connected by a pivot pin and biased to a closed position by a torsion spring (not illustrated) that surrounds the pivot pin. A screw 816 is utilized for attaching thereto a threaded connector 818 for coupling to a mating lead wire receptacle (not shown). The threaded connector 818 extends through an opening in the back end of the color-coded plastic clip-cover 820 and is seated thereto by the star washer 822 and molded plastic nut 824. A bolt 802, washer 810, and retaining nut 812 complete the assembly 800.

Figure 8B:
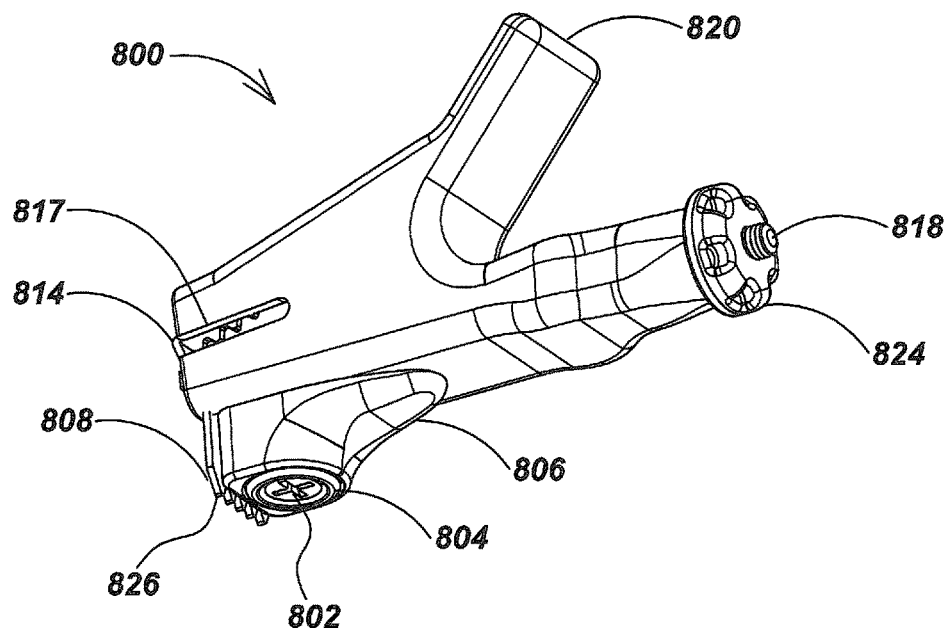
FIG. 8B is an isometric view of the spring clip assembly of FIG. 8A.

FIG. 8B is an isometric view of the spring clip assembly 800 showing the threaded connector 818, the nut 824, the thumb-actuated spring clip 820 inside an insulating cover, and the magnetic attachment housing 806. Scraper edge 808, bolt 802, and magnet 804 are attached as shown in FIG. 8A. The teeth 826 of scraper edge 808 are slightly higher than the face of magnet 804 to force electrical contact with the teeth 826 when the magnetic attaching method is used.

Figure 8C:
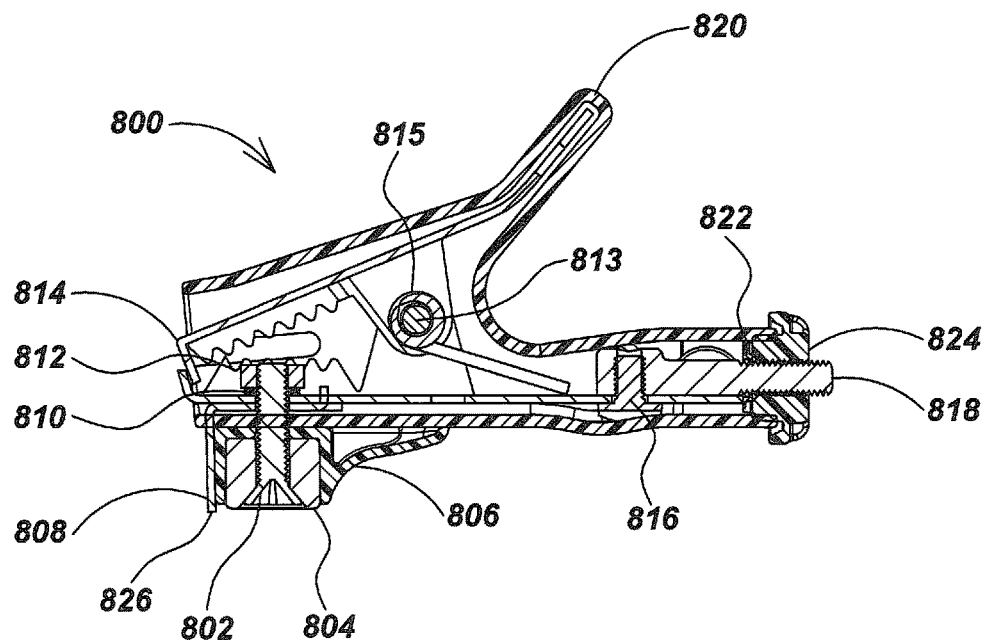
FIG. 8C is a side section view of the spring clip assembly of FIG. 8A.

FIG. 8C is a side section view of the spring clip assembly 800 illustrating the relative disposition of the magnet holding bolt 802, magnet housing 806, magnet 804 and spring clip structure 814 covered by color-coded plastic clip-cover 820. The threaded connector 818 leads through an opening in the back end of the plastic clip-cover 820 and is seated thereto by the star washer 822 and molded plastic nut 824 at the outer end, and affixed to clip 814 by screw 816 at the head of the threaded connector 818.

Figure 9A:
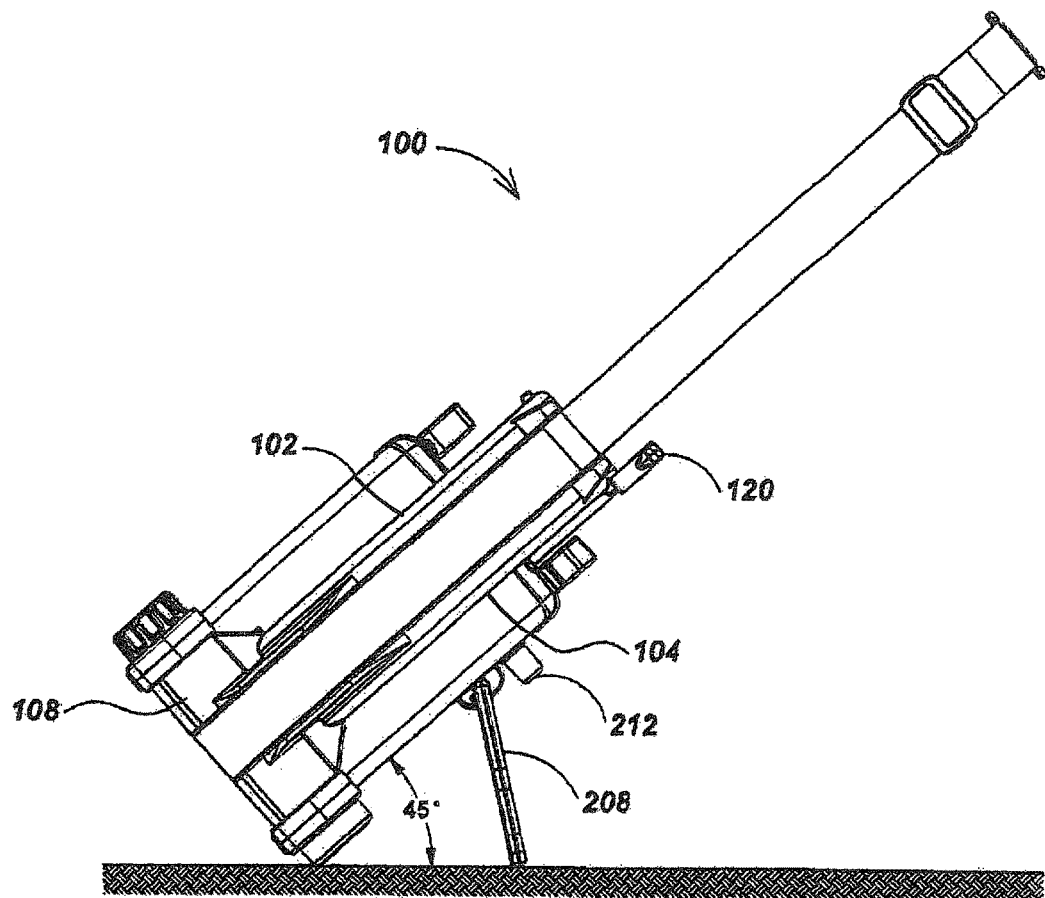
FIG. 9A is a side view of the transmitter apparatus embodiment of FIG. 1 shown in use while disposed on an integrated kickstand at a 45 degree angle with respect to the ground.

FIG. 9A is a side view of the transmitter apparatus 100 disposed on an integrated kickstand 208 at a 45 degree angle with respect to the ground. Integrated kickstand 208 is folded out so that transmitter assembly 100 is supported on a tripod comprising the kickstand 208, one side of the near battery pod 108 and one side of the far battery pod (not shown). The front shell 102 and back shell 104 are shown, as is one of the support posts 212. Kickstand 208 allows the operator to orient the output resonator inductive field toward a conductor of interest while more easily accessing the operator controls (not shown) on the surface of the front shell 102.

Figure 9B:
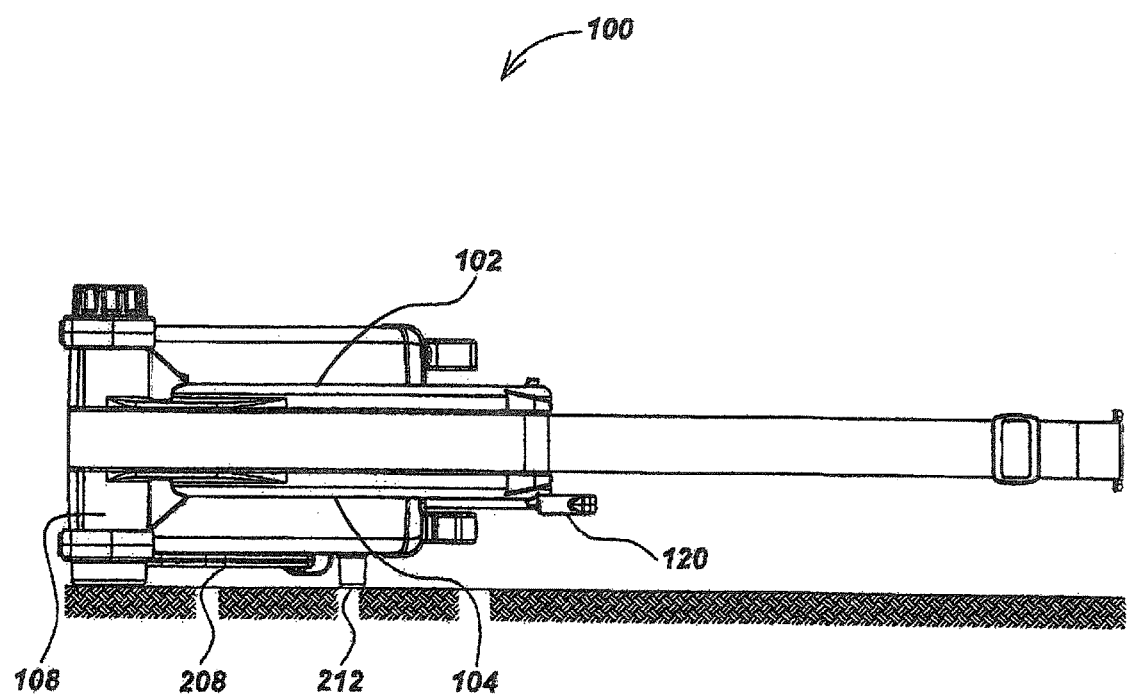
FIG. 9B is a side view of the transmitter apparatus embodiment of FIG. 1 shown in use while disposed on integrated support posts relatively flat to the plane of the ground.

FIG. 9B is a side view of the transmitter apparatus 100 shown in use while disposed on its back relatively flat to the plane of the ground and supported by integrated support posts 212. Transmitter apparatus 100 is disposed with the front shell 102 facing upward and resting on the support posts 212 and on the battery pods 108 so that the rear shell 104 faces the ground. The grounding stake 120 is not used in this exemplary inductive-mode deployment of the transmitter apparatus 100.

Figure 10:
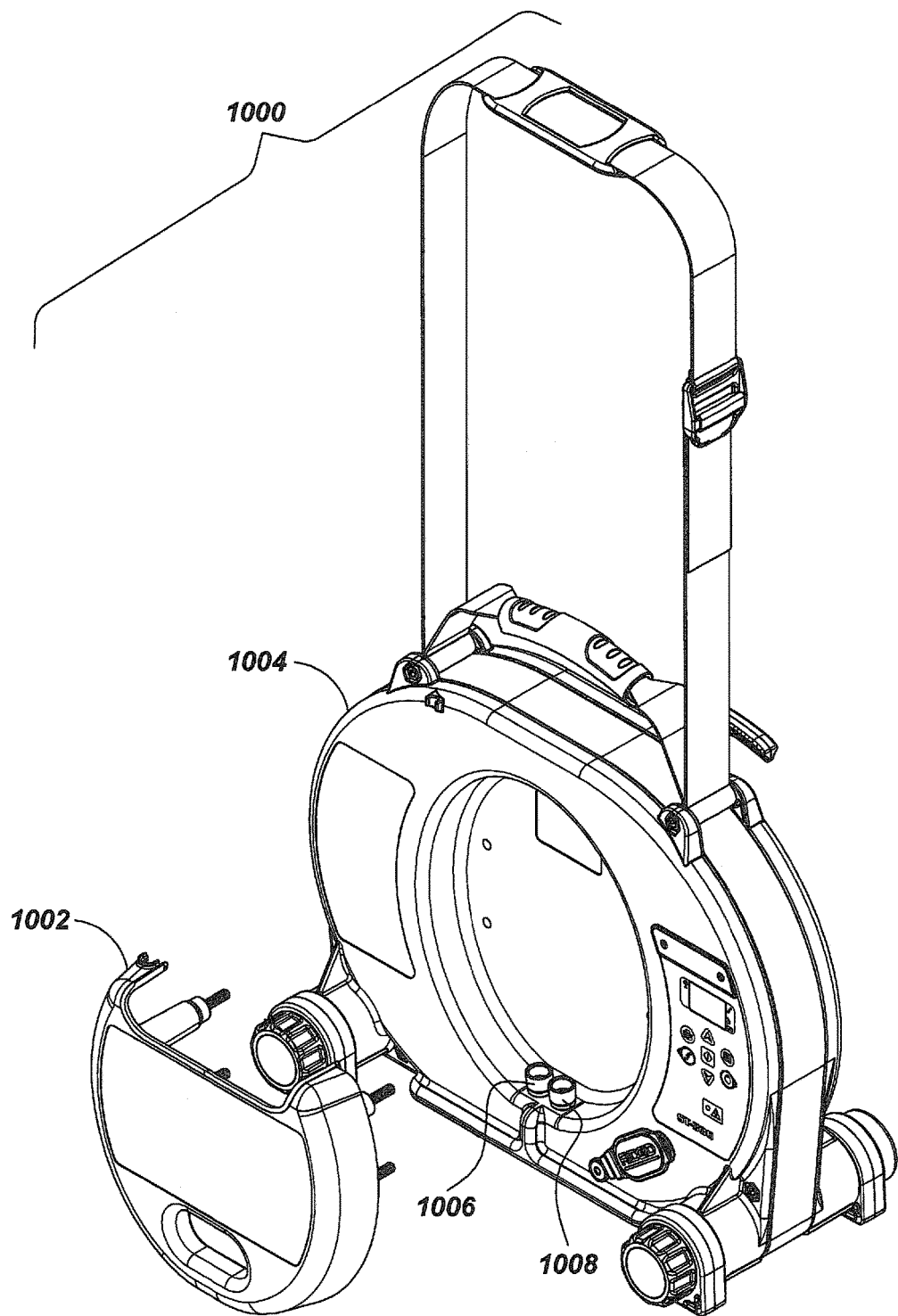
FIG. 10 is an expanded oblique view of an alternative transmitter apparatus embodiment in which two female sockets are included in a front panel pocket to facilitate the insertion and energizing of a High-Voltage Booster Adaptor element.

An alternative transmitter apparatus embodiment of this invention may be equipped with a Booster module for conductively coupling high-voltage signals into a conductor to facilitate fault localization, for example, or high-impedance circuit tracing. FIG. 10 is an expanded oblique view of such an alternative transmitter apparatus embodiment 1000 in which two female sockets 1006 and 1008 are included in a front panel pocket 1002 to facilitate the insertion and energizing of a High-Voltage Booster Adaptor element Front pocket 1002 is shown separated from the front shell 1004 for ease of illustration. Within the recession in the front shell 1004 thus revealed are disposed two female sockets 1006 and 1008, which may be provided with protective caps (not shown) for insertion when not in use. A first socket 1006 is adapted for connection to the coil-cord plug (FIGS. 1 and 2) during normal-voltage operation, thereby providing an electrical connection from the clip at the end of the front coil-cord (FIG. 1) to the transmitter circuit. The second socket 1008 is capped during normal-voltage use. During high-voltage operations, a High-Voltage Booster Adaptor equipped with two male plugs is inserted into the two sockets (FIGS. 11B and 11C).

Figure 11A:
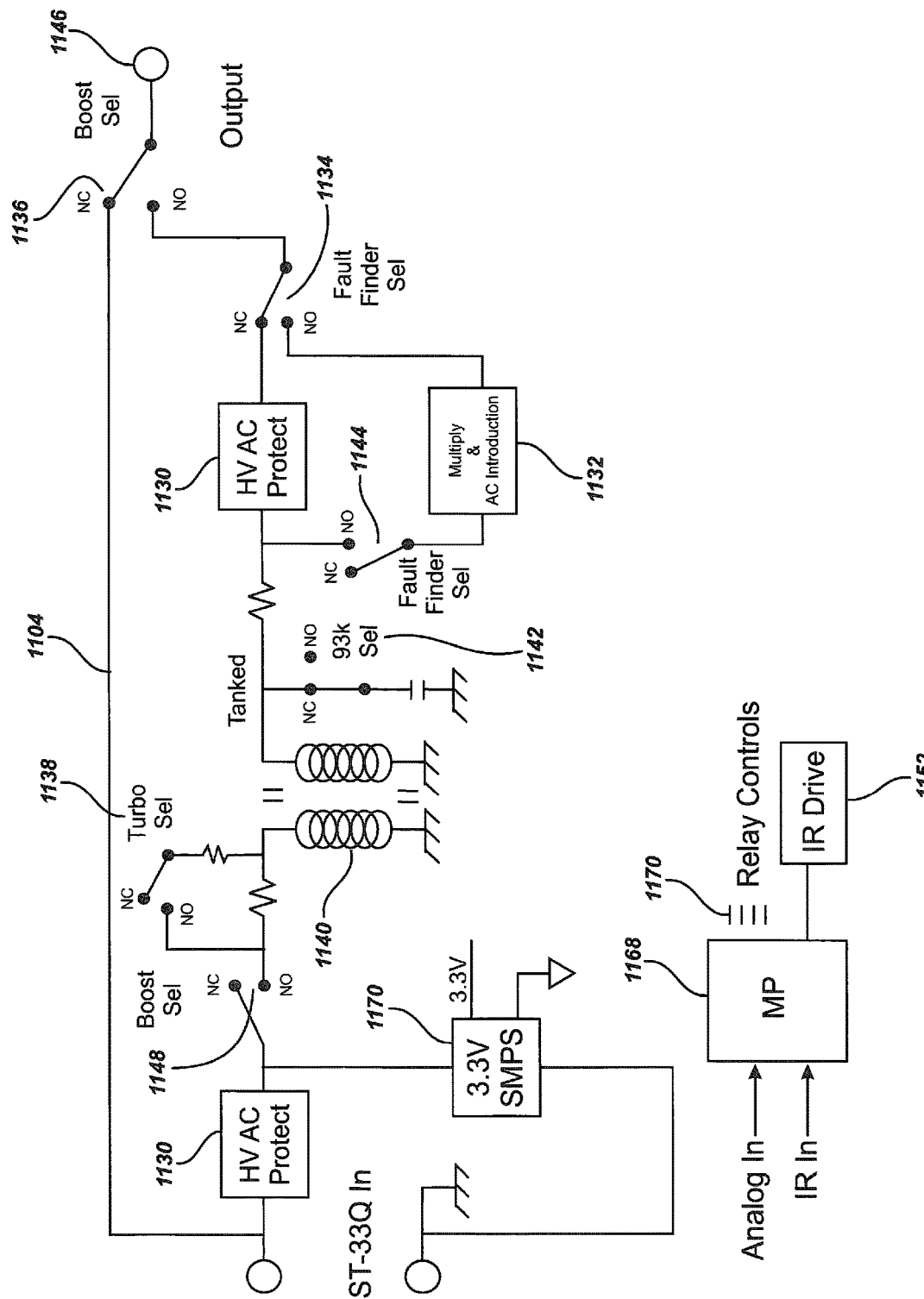
FIG. 11A is a block diagram illustrating the functional relationship of the High Voltage Booster Adapter element in the transmitter apparatus embodiment of FIG. 10.

FIG. 11A is a block diagram illustrating the functional relationship of the High Voltage Booster Adapter element in the transmitter apparatus 1000, showing a separate switched circuit used in high-voltage operations. In FIG. 11A, a switched-mode power supply 1150 governs voltage to the booster circuit (not shown). The power supply 1150 is adapted to communicate its state to the transmitter apparatus 1000. Responsive to transmitter commands, transmitter apparatus 1000 may switch into "booster mode" (high-voltage operation) by closing booster selection relays 1148 and 1136. This booster selection activates transformer 1140 and two high-voltage protection circuits 1130, which operate initially at 33 kHz. Responsive to the appropriate user-initiated transmitter command stream, the microprocessor also activates the 93 kHz frequency by closing selector relay 1142. During operation, responsive to a user-selected current demand, the booster system may increase current demand, which may require closing the Turbo relay 1138. Depending on the details of user control inputs at the transmitter, the microprocessor may also switch the output circuit into fault-localization mode by closing relays 1134 and 1144, whereby current is routed through multiplier and AC introduction block 1132 to produce a high-voltage Extra-Low Frequency (ELF) output with a high-voltage AC current injected onto it and channeled to output 1146. Analog signals and IR signals are received at the microprocessor 1168 and responsive signals produced and coupled to relay controls 1170 and the IR drive 1152 to relay information to the transmitter.

Figure 11B:
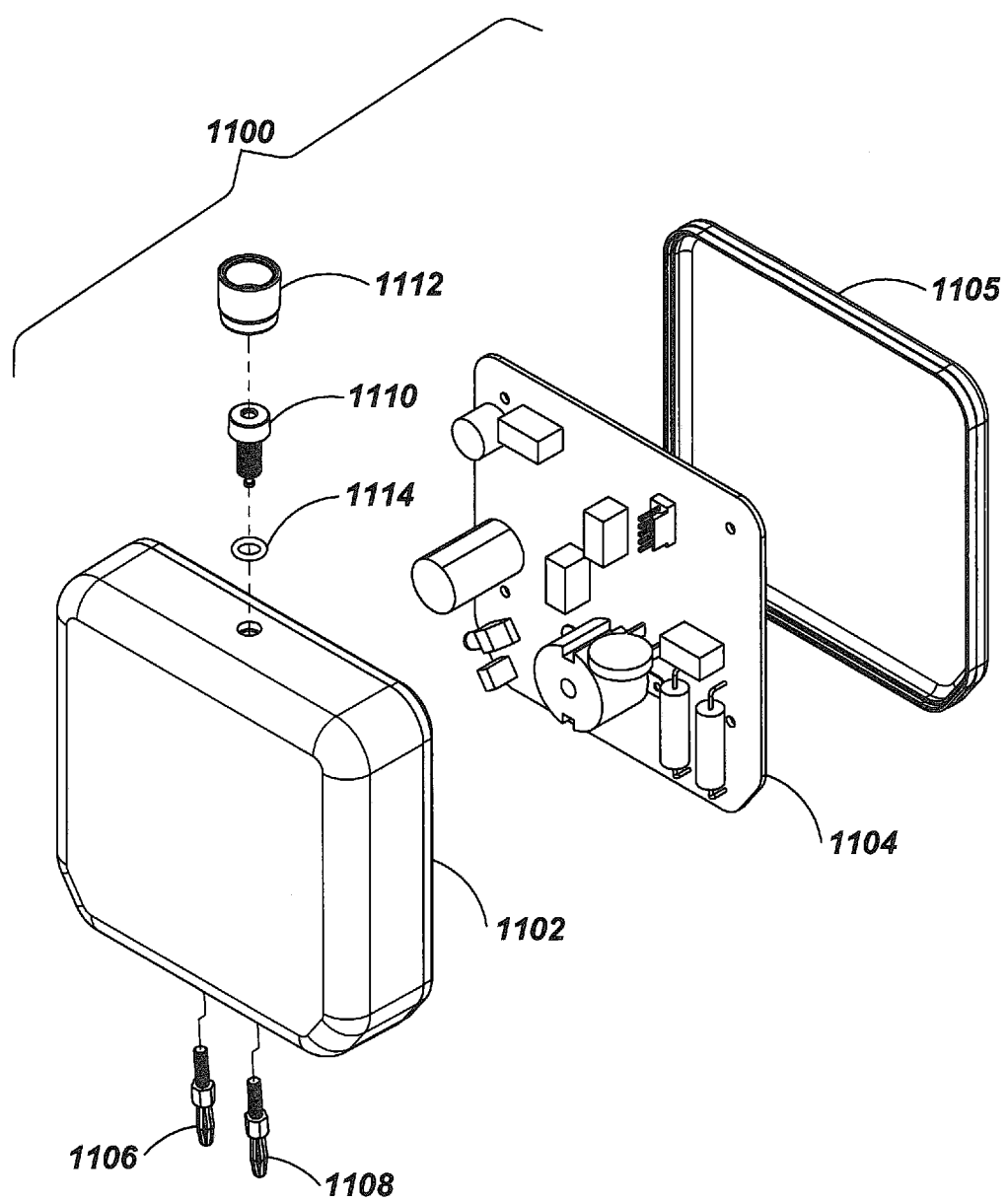
FIG. 11B is an expanded view of a High Voltage Booster Adaptor embodiment suitable for use with the transmitter apparatus embodiment of FIG. 10.

FIG. 11B is an expanded view of a High Voltage Booster Adaptor embodiment 1100 suitable for use with transmitter apparatus 1000. In FIG. 11B, the High-Voltage Adaptor Unit 1100 includes a front case 1102 and a rear case 1105 with integrated circuitry 1104 installed on the inner face of the rear case 1105. Two banana plugs 1106 and 1108 extending from the lower surface of the front case 1102 are adapted to fit into the two female sockets 1006, 1008 (FIG. 10). The top surface of the front case 1102 includes a female socket 1110 fitted to a hole in the top of the front case 1102 and seated with an O-Ring 1114 and an insulating collar 1112. The female socket 1110 is adapted to accept the front coil-cord plug (FIG. 11C) of the transmitter and is electrically connected to the electrical path used by the front coil-cord when it is plugged into socket 1006 (FIG. 10) during normal-voltage use. The outer surface of the socket 1110 is threaded to receive a washer and retaining nut (not shown) inside the front case 1102.

Figure 11C:
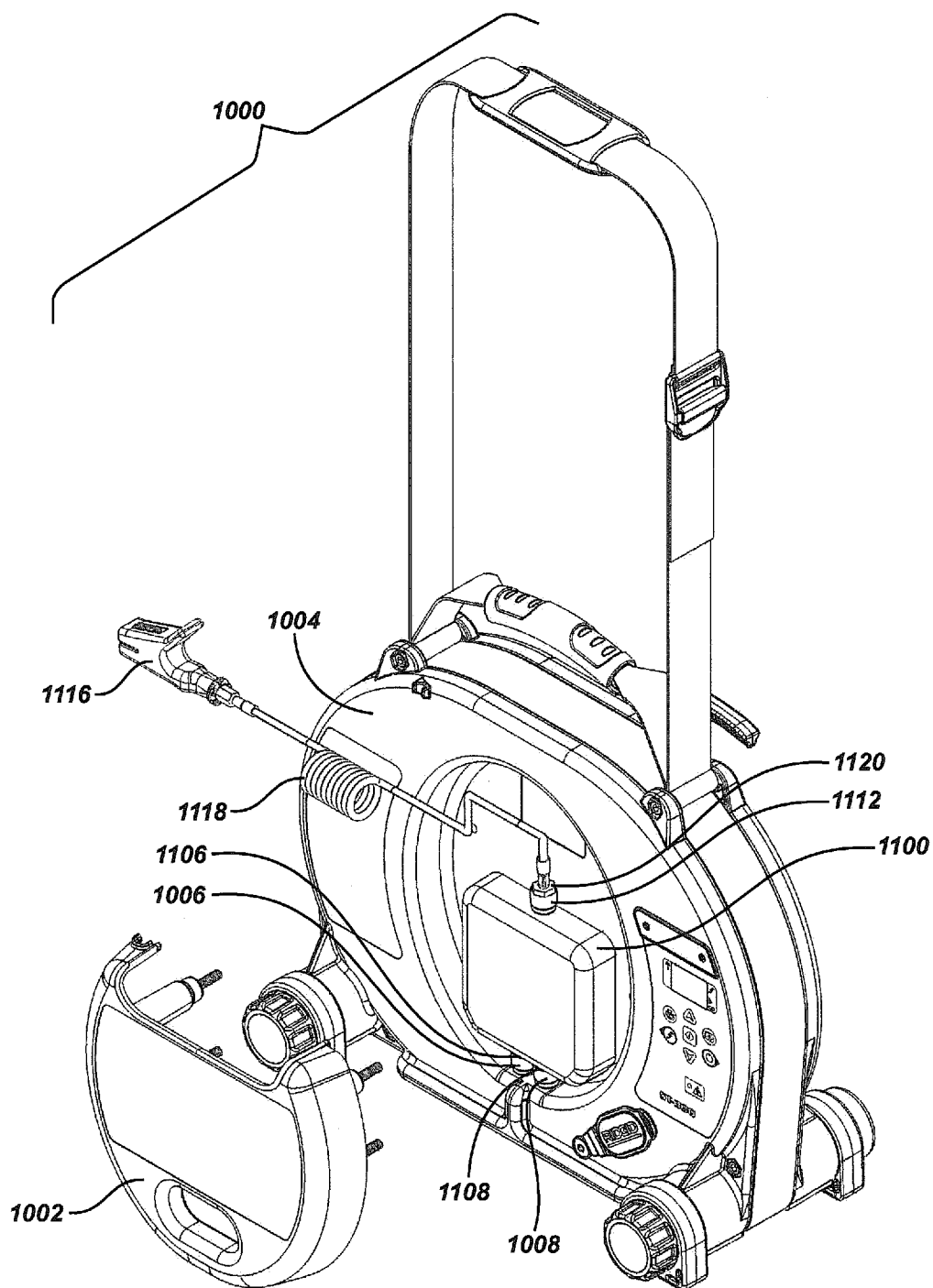
FIG. 11C is an expanded oblique view of a transmitter apparatus embodiment of FIG. 10 illustrating a High Voltage Booster Adaptor element fitted to the transmitter apparatus for use.

FIG. 11C is an expanded oblique view of transmitter apparatus 1000 illustrating a High Voltage Booster Adaptor 1100 fitted in a configuration typical for high-voltage use. Adaptor 1100 is connected by inserting plugs (not shown) into the two female sockets 1006 and 1008 inside the space defined within the front pocket 1002, which is shown removed for clarity of illustration. A front coil-cord 1118 with attached magnetic clip 1116 is shown terminating in a plug 1120 adapted to mate with a socket on top of the adaptor 1100 within its collar 1112.

While we have herein described only a few embodiments of the transmitter apparatus of this invention, those skilled in the art can readily appreciate that our examples may be modified in both arrangement and detail in view of these teachings without departing from the invention claimed below. For example, the Litz-wire air-core coil winding 302 (FIG. 3) need not be cylindrical, although that is preferred. And the air-coil winding 302 may be any arrangement of one or more turns of an appropriate conductor suitable for use as an inductor. Also, the Litz wire need not be braided, nor limited to a plurality of tiny cylindrical wires. The winding 302 may have any useful low AC-loss conductor arrangement; for example, the winding 302 may comprise a plurality of thin insulated copper sheets, such as, for example, copper-clad Kapton® (registered trademark of DuPont, Inc.) layers adapted from printed circuit board applications and having low AC-losses. A Multifilar® (registered trademark of MWS Wire Industries, Inc.) flat magnet wire, for example, is also suitable for use as a low AC-loss conductor. Ten strands of such wire bonded together in a flat strip is readily available commercially. The winding 302 may be formed by winding conductor strands from, for example, twenty or thirty separate spools simultaneously. Copper, gold and silver are preferred metals for the requisite low AC-loss conductor. Tuning may be facilitated by switching individual turns in and out of the winding 302 instead of switching capacitors in and out of the tank circuit. In an alternative embodiment, adaptively adjusting the drive frequency to the tuned circuits resonance $f_R$ may be employed with similar utility. To facilitate the real-time the resonant frequency adaptation element of this invention, exemplified herein as employing FETs, other electronic switches or elements may be used, including HEXFETs, mechanical switch relays, bipolar junction transistors, etc., with similar utility Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

We claim:

1. A transmitter apparatus for use in utility locating, comprising:
   a substantially non-conductive, non-magnetic case;
   a user interface (UI) for accepting operator commands disposed on or within the case;
   a resonant coil winding supported by the case and defining a cylinder;
   a driver circuit board connected to the resonant coil winding and mounted in the case; and
   a kickstand support coupled to the non-magnetic case and extensible therefrom for supporting the case on a flat surface in a tilted configuration that directs an axis of rotation of the resonant coil winding to a predefined orientation.

2. The transmitter apparatus of claim 1, wherein the driver circuit includes an exciter circuit for generating an excitation current signal having a frequency corresponding to a user selected output frequency, where the resonant coil is coupled to an output of the exciter circuit.

3. The transmitter of claim 2, wherein the excited circuit provides an output signal in the Extra-Low Frequency (ELF) frequency band.

4. The transmitter apparatus of claim 1, further comprising a conductor assembly including at least one conductive coil defining a low-permeability core volume, wherein at least half of the transmitter apparatus elements are disposed outside of the low-permeability core volume during operation of the transmitter apparatus.

5. The transmitter apparatus of claim 4, wherein the transmitter apparatus elements are disposed such that the low-permeability core volume is substantially empty during operation of the transmitter apparatus.

6. The transmitter apparatus of claim 4, further comprising, in the conductor assembly, a Litz wire conductor.

7. The transmitter apparatus of claim 1, further comprising a conductor assembly having at least one conductive coil defining a low-permeability core volume disposed about an axis of rotation; and at least one integral support for supporting the transmitter apparatus on a flat surface in an orientation that directs the conductive coil axis of rotation into the flat surface during operation.

8. The transmitter apparatus of claim 1, further comprising a spring clip assembly including a thumb-actuated element having two jaws biased to a closed position for coupling an output current to a buried utility.

9. The transmitter apparatus of claim 8, wherein at least a portion of the spring clip assembly is color-coded to indicate the current direction with respect to current flow provided from the transmitter apparatus.

10. The transmitter apparatus of claim 1, further comprising a High Voltage (HV) booster circuit coupled to the resonant coil winding for increasing the output signal.

11. The transmitter of claim 1, wherein the resonant coil is a component of an adaptive self-correcting tunable high-Q resonator for inducing alternating currents in one or more conductive utilities.

12. The transmitter of claim 1, further comprising:
    an adaptive self-correcting tunable high-Q resonator, including a resonant coil winding, for inducing a precisely controlled alternating current in one or more conductive buried utilities.

13. The transmitter apparatus of claim 12, wherein the resonator is adaptively re-tunable to a predetermined resonant frequency responsive to a circuit resonant change.

* * * * *